United States Patent
Chang et al.

(10) Patent No.: US 7,672,514 B2
(45) Date of Patent: Mar. 2, 2010

(54) METHOD AND APPARATUS FOR DIFFERENTIATING PEDESTRIANS, VEHICLES, AND OTHER OBJECTS

(75) Inventors: Peng Chang, West Windsor, NJ (US); Theodore Armand Camus, Marlton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 1204 days.

(21) Appl. No.: 11/070,613

(22) Filed: Mar. 2, 2005

(65) Prior Publication Data
US 2005/0232491 A1  Oct. 20, 2005

Related U.S. Application Data

(60) Provisional application No. 60/549,203, filed on Mar. 2, 2004, provisional application No. 60/605,339, filed on Aug. 27, 2004.

(51) Int. Cl.
*G06K 9/00* (2006.01)
(52) U.S. Cl. .................. 382/199; 382/203; 382/266; 382/103; 382/104
(58) Field of Classification Search .................. 382/103, 382/104, 199, 203, 266
See application file for complete search history.

(56) References Cited

U.S. PATENT DOCUMENTS

| | | | |
|---|---|---|---|
| 5,283,837 A | 2/1994 | Wood | |
| 5,761,326 A * | 6/1998 | Brady et al. | 382/103 |
| 5,793,375 A | 8/1998 | Tanaka | |
| 5,793,900 A | 8/1998 | Nourbakhsh et al. | |
| 5,809,161 A | 9/1998 | Auty et al. | |
| 6,396,535 B1 | 5/2002 | Waters | |
| 6,925,403 B2 * | 8/2005 | Nowak | 702/94 |
| 6,956,469 B2 | 10/2005 | Hirvonen et al. | |
| 2003/0235327 A1 * | 12/2003 | Srinivasa | 382/104 |
| 2004/0075654 A1 | 4/2004 | Hsiao et al. | |

OTHER PUBLICATIONS

Chang et al., Stereo-Based Object Detection, Classification and Quantitative Evaluation with Automotive Applications 2005, IEEE 1063-6919/05, pp. 1-6.

C.R. Allen et al., 3D Scene Reconstruction and Object Recognition for user with Autonomously Guided Vehicles (AGV'S), 1995, IEEE 0-7803-3026-9/95, pp. 1219-1224, Robotics Research Group, Newcastle University.

* cited by examiner

*Primary Examiner*—Wesley Tucker
(74) *Attorney, Agent, or Firm*—Lowenstein Sandler PC

(57) ABSTRACT

A method and apparatus for classifying an object in an image is disclosed. Edges of an object are detected within a region of interest. Edge analysis is performed on a plurality of sub-regions within the region of interest to generate an edge score. The object is classified based on the edge score.

29 Claims, 13 Drawing Sheets

METHOD AND APPARATUS FOR DIFFERENTIATING PEDESTRIANS, VEHICLES, AND OTHER OBJECTS

CROSS-REFERENCE TO RELATED APPLICATIONS

This application claims the benefit of U.S. provisional patent application Nos. 60/549,203 filed, Mar. 2, 2004 and 60/605,339, filed Aug. 27, 2004, which are herein incorporated by reference.

BACKGROUND OF THE INVENTION

1. Field of the Invention

The present invention relates to artificial or computer vision systems, e.g. vehicular vision systems. In particular, this invention relates to a method and apparatus for detecting automobiles and pedestrians in a manner that facilitates collision avoidance.

2. Description of the Related Art

Collision avoidance systems utilize a sensor system for detecting objects in front of an automobile or other form of vehicle or platform. In general, a platform can be any of a wide range of bases, including a boat, a plane, an elevator, or even a stationary dock or floor. The sensor system may include radar, an infrared sensor, or another detector. In any event the sensor system generates a rudimentary image of the scene in front of the vehicle. By processing that imagery, objects can be detected. Collision avoidance systems generally identify when an object is in front of a vehicle, but usually do not classify the object or provide any information regarding the movement of the object.

Therefore, there is a need in the art for a method and apparatus that provides for differentiating detected objects.

SUMMARY OF THE INVENTION

The present invention describes a method and apparatus for classifying an object in an image. In one embodiment, edges of an object are detected within a region of interest. Edge analysis is performed on a plurality of sub-regions within the region of interest to generate an edge score. The object is classified based on the edge score.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention discloses in one embodiment method and apparatus for classifying an object in a region of interest based on one or more features of the object. Detection and classification of pedestrians, vehicles, and other objects are important, e.g., for automotive safety devices, since these devices may deploy in a particular fashion only if a target of the particular type (i.e., pedestrian or car) is about to be impacted. In particular, measures employed to mitigate the injury to a pedestrian may be very different from those employed to mitigate damage and injury from a vehicle-to-vehicle collision.

Figure 1:
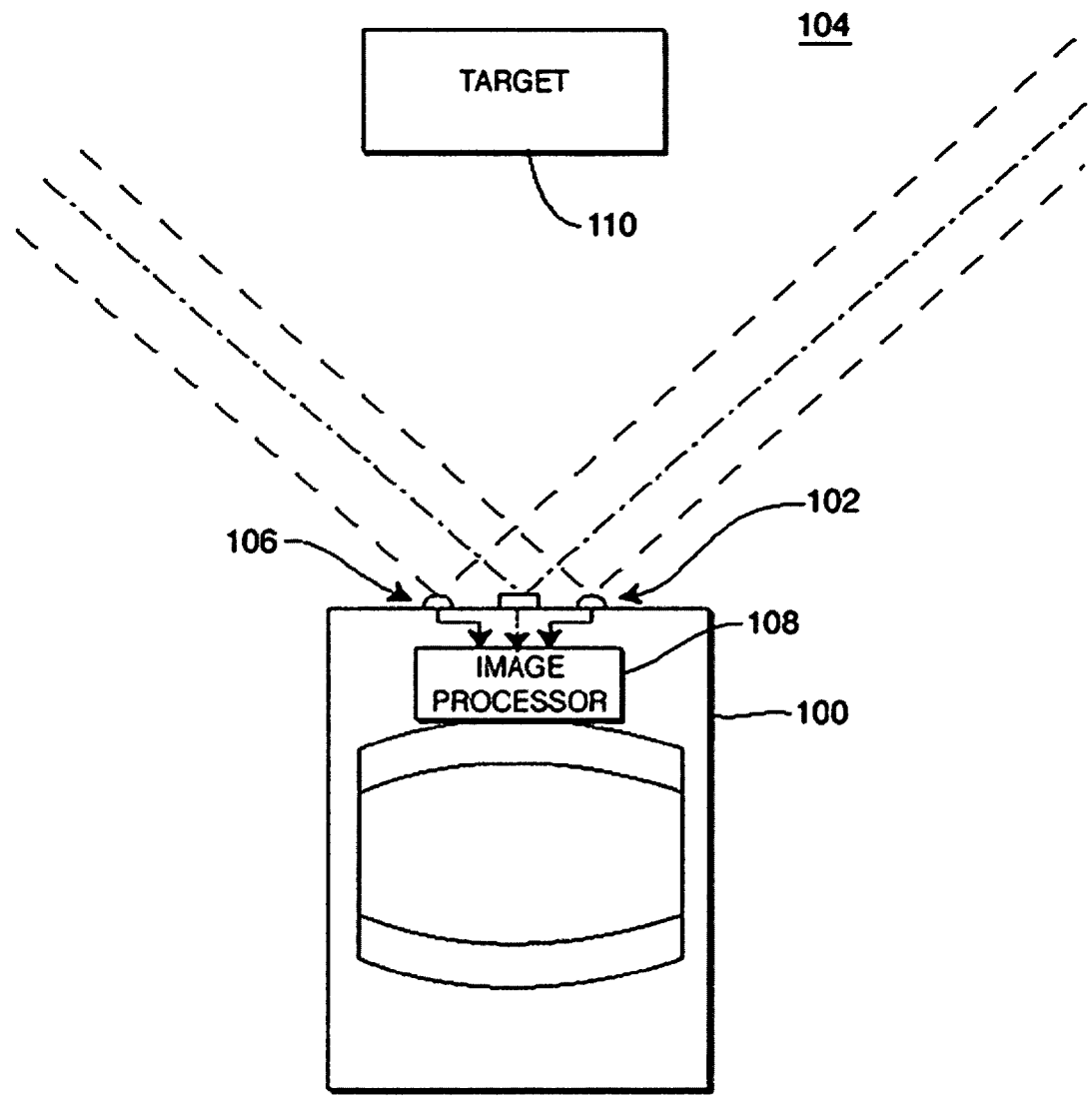
FIG. 1 depicts one embodiment of a schematic view of a vehicle utilizing the present invention.

FIG. 1 depicts a schematic diagram of a vehicle 100 having a target differentiation system 102 that differentiates a pedestrian (or pedestrians) 110 within a scene 104 that is proximate the vehicle 100. It should be understood that target differentiation system 102 is operable to detect pedestrians, automobiles, or other objects. While in the illustrated embodiment scene 104 is in front of vehicle 100, other object detection systems may image scenes that are behind or to the side of vehicle 100. Furthermore, target differentiation system 102 need not be related to a vehicle, but can be used with any type of platform, such as a boat, a plane, an elevator, or even stationary streets, docks, or floors. Target differentiation system 102 comprises a sensor array 106 that is coupled to an image processor 108. The sensors within the sensor array 106 have a field of view that includes one or more targets.

The field of view in a practical object detection system 102 may be ±12 meters horizontally in front of the vehicle 100 (e.g., approximately 3 traffic lanes), with a ±3 meter vertical area, and have a view depth of approximately 5-40 meters. (Other fields of view and ranges are possible, depending on camera optics and the particular application.) Therefore, it should be understood that the present invention can be used in a pedestrian detection system or as part of a collision avoidance system.

Figure 2:
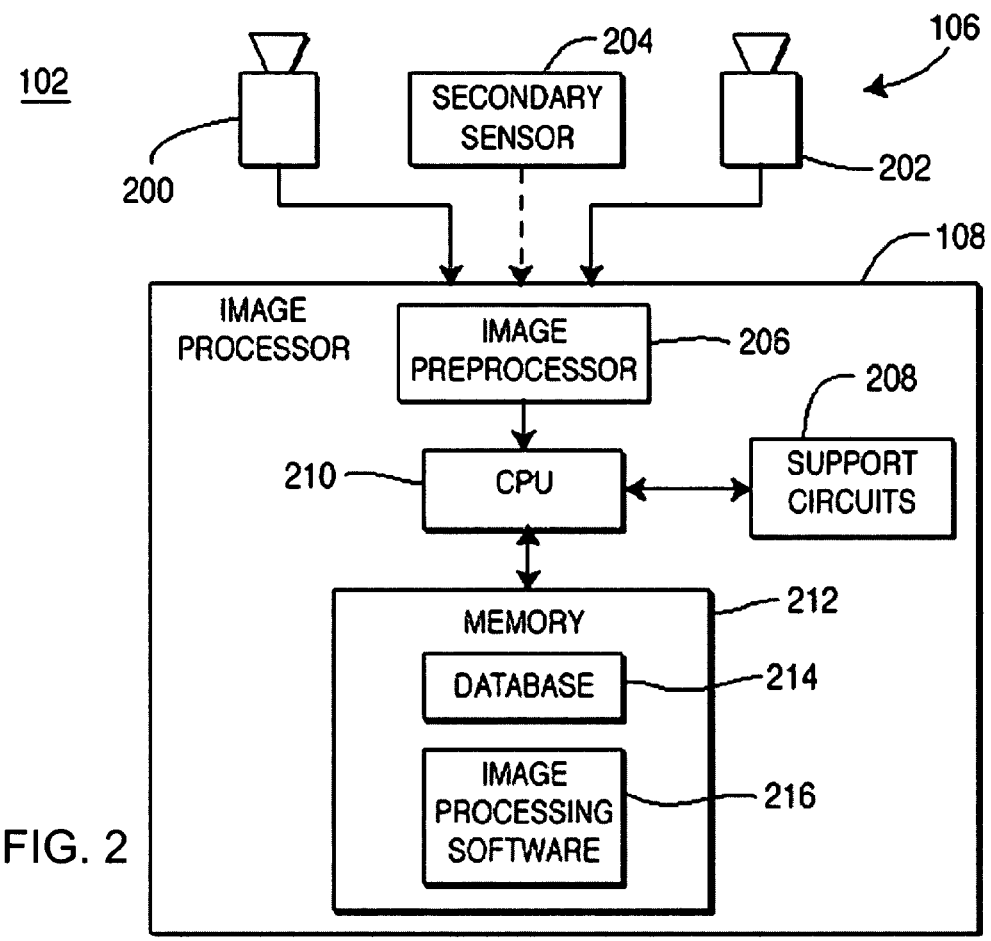
FIG. 2 depicts a block diagram of a vehicular vision system in accordance with one embodiment of the present invention.

FIG. 2 depicts a block diagram of hardware used to implement the target differentiation system 102. The sensor array 106 comprises, for example, a pair of cameras 200 and 202. In some applications an optional secondary sensor 204 can be included. The secondary sensor 204 may be radar, a light detection and ranging (LIDAR) sensor, an infrared range finder, a sound navigation and ranging (SONAR) senor, and the like. The cameras 200 and 202 generally operate in the visible wavelengths, but may be augmented with infrared sensors, or the cameras may themselves operate in the infrared range. The cameras have a known, fixed relation to one another such that they can produce a stereo image of the scene 104. Therefore, the cameras 200 and 202 will sometimes be referred to herein as stereo cameras.

Still referring to FIG. 2, the image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. CPU 210 is supported by support circuits 208 that are generally well known in the art. These circuits include cache, power supplies, clock circuits, input-output circuitry, and the like. Memory 212 is also coupled to CPU 210. Memory 212 stores certain software routines that are retrieved from a storage medium, e.g., an optical disk, and the like, and that are executed by CPU 210 to facilitate operation of the present invention. Memory 212 also stores certain databases 214 of information that are used by the present invention, and image processing software 216 that is used to process the imagery from the sensor array 106. Although the present invention is described in the context of a series of method steps, the method may be performed in hardware, software, or some combination of hardware and software (e.g., an ASIC). Additionally, the methods as disclosed can be stored on a computer readable medium.

Figure 3:
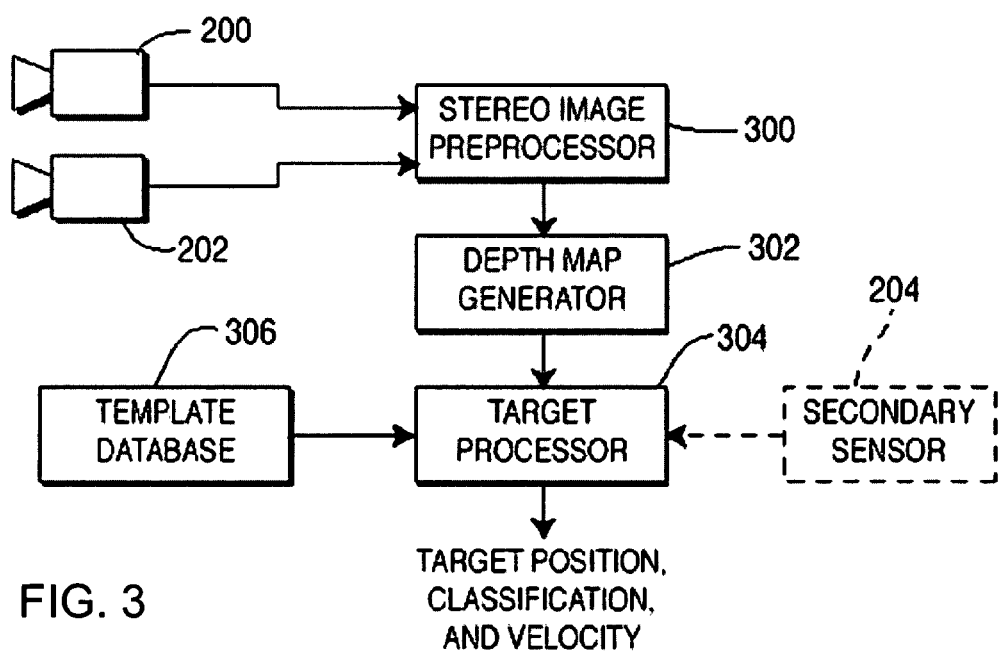
FIG. 3 depicts a block diagram of functional modules of the vision system of FIG. 2 in accordance with one embodiment of the present invention.

FIG. 3 is a functional block diagram of modules that are used to implement the present invention. The stereo cameras 200 and 202 provide stereo imagery to a stereo image preprocessor 300. The stereo image preprocessor is coupled to a depth map generator 302 which is coupled to a target processor 304. Depth map generator 302 may be utilized to define a region of interest (ROI), i.e., an area of the image that potentially contains a target 110. In some applications the depth map generator 302 is not used. In applications where depth map generator 302 is not used, ROIs would be determined using image-based methods. The following will describe the functional block diagrams under the assumption that a depth map generator 302 is used. The target processor 304 receives information from a target template database 306 and from the optional secondary sensor 204. The stereo image preprocessor 300 calibrates the stereo cameras, captures and digitizes imagery, warps the images into alignment, performs pyramid wavelet decomposition, and performs stereo matching, which is generally well known in the art, to create disparity images at different resolutions.

For both hardware and practical reasons, creating disparity images having different resolutions is beneficial when detecting objects. Calibration provides for a reference point and direction from which all distances and angles are determined. Each of the disparity images contains the point-wise motion from the left image to the right image and each corresponds to a different image resolution. The greater the computed disparity of an imaged object, the closer the object is to the sensor array.

The depth map generator 302 processes the multi-resolution disparity images into a two-dimensional depth image. The depth image (also referred to as a depth map) contains image points or pixels in a two dimensional array, where each point represents a specific distance from the sensor array to point within the scene. The depth image is then processed by the target processor 304 wherein templates (models) of typical objects encountered by the vision system are compared to the information within the depth image. As described below, the template database 306 comprises templates of objects (e.g., automobiles, pedestrians) located at various positions and depth with respect to the sensor array.

An exhaustive search of the template database may be performed to identify a template that most closely matches the present depth image. The secondary sensor 204 may provide additional information regarding the position of the object relative to the vehicle, velocity of the object, size or angular width of the object, etc., such that the target template search process can be limited to templates of objects at about the known position relative to the vehicle. If the secondary sensor is a radar sensor, the sensor can, for example, provide an estimate of both object position and distance. The target processor 304 produces a target list that is then used to identify target size and classification estimates that enable target tracking and the identification of each target's position, classification and velocity within the scene. That information may then be used to avoid collisions with each target or perform pre-crash alterations to the vehicle to mitigate or eliminate damage (e.g., lower or raise the vehicle, deploy air bags, and the like).

Figure 4:
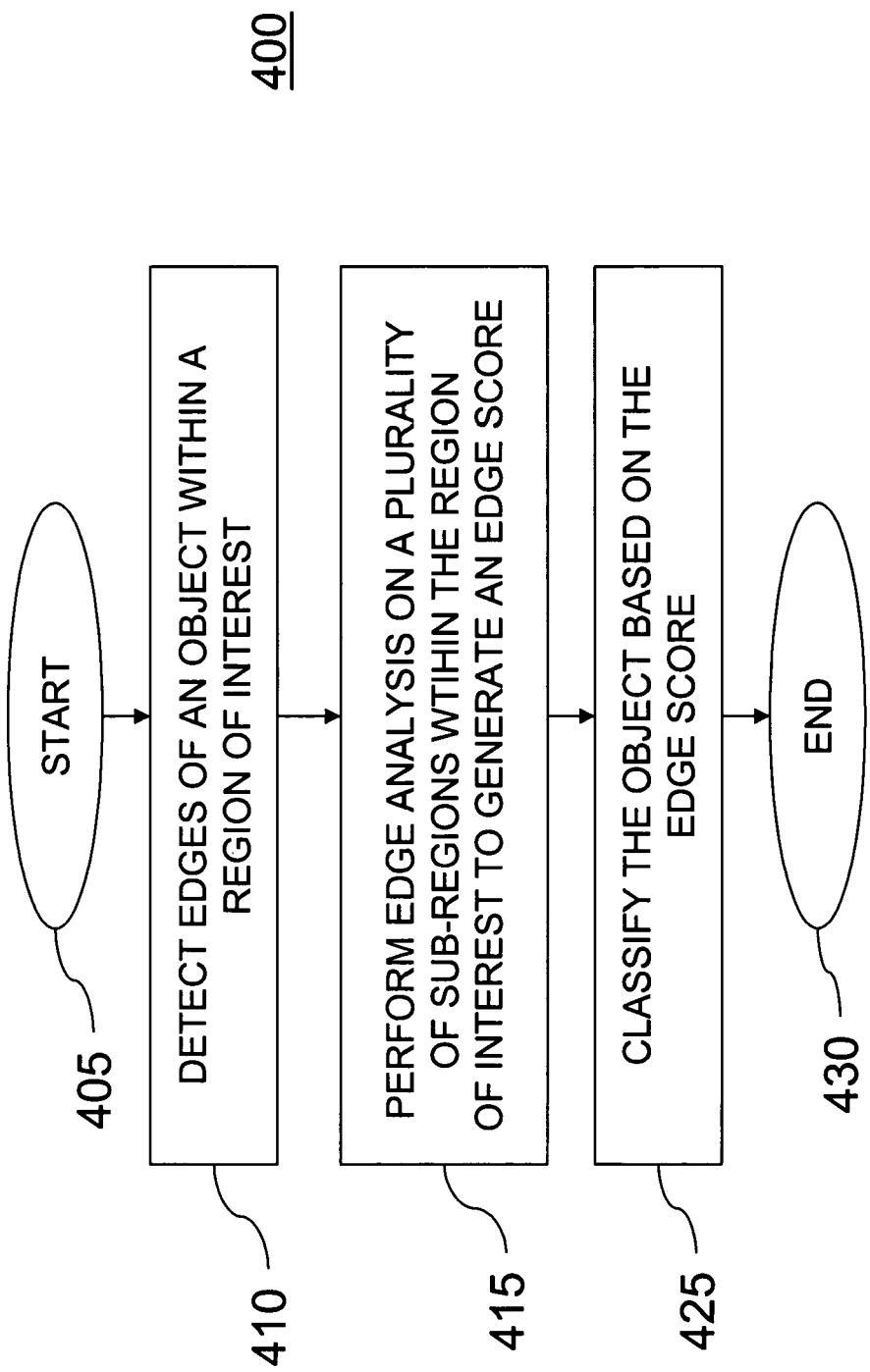
FIG. 4 illustrates a flow diagram in accordance with a method of the present invention.

FIG. 4 depicts a flow diagram of a method 400 for verifying an object in an image. The method 400 begins at step 405 and proceeds to step 410. In step 410, edges are detected for an object within a region of interest (ROI). The present invention describes the use of a depth based method to find a ROI where a target 110 may be located, however, ROIs may also be determined using image based methods.

Figure 5:
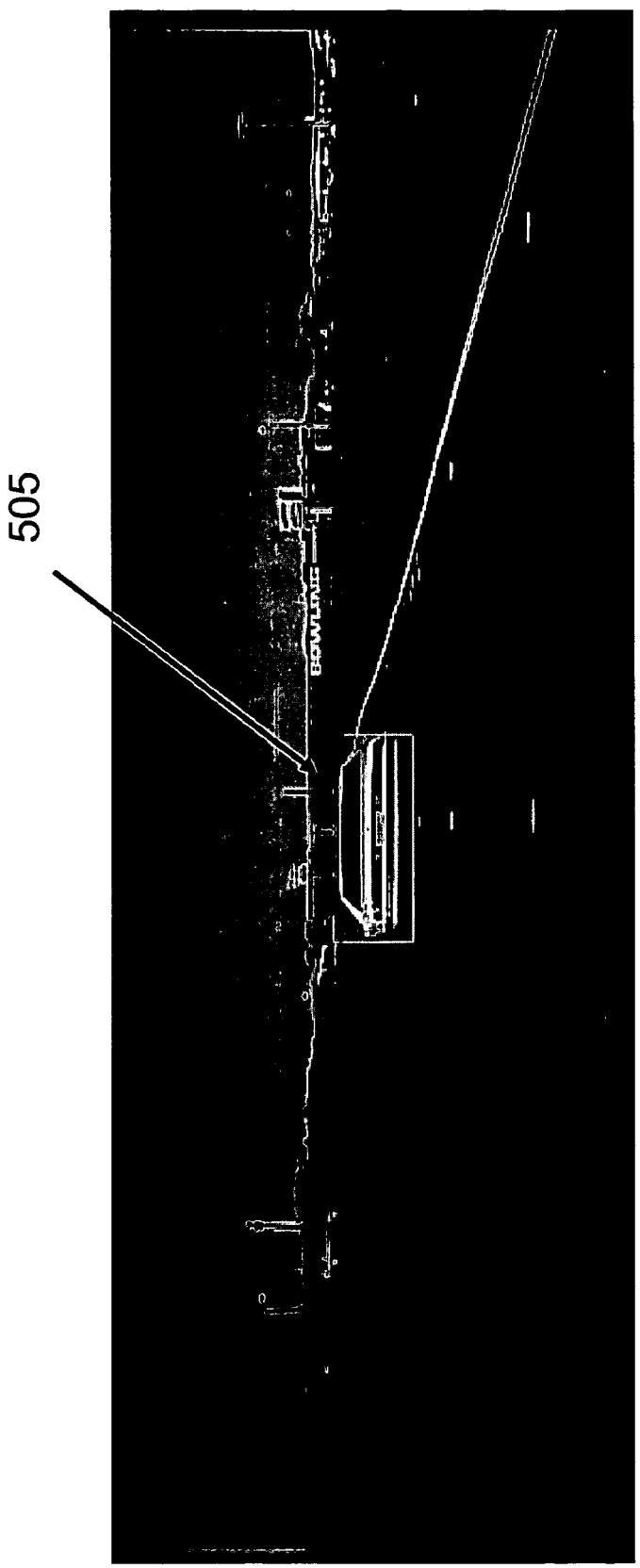
FIG. 5 illustrates a car located within a region of interest in accordance with one embodiment of the present invention.
Figure 6:
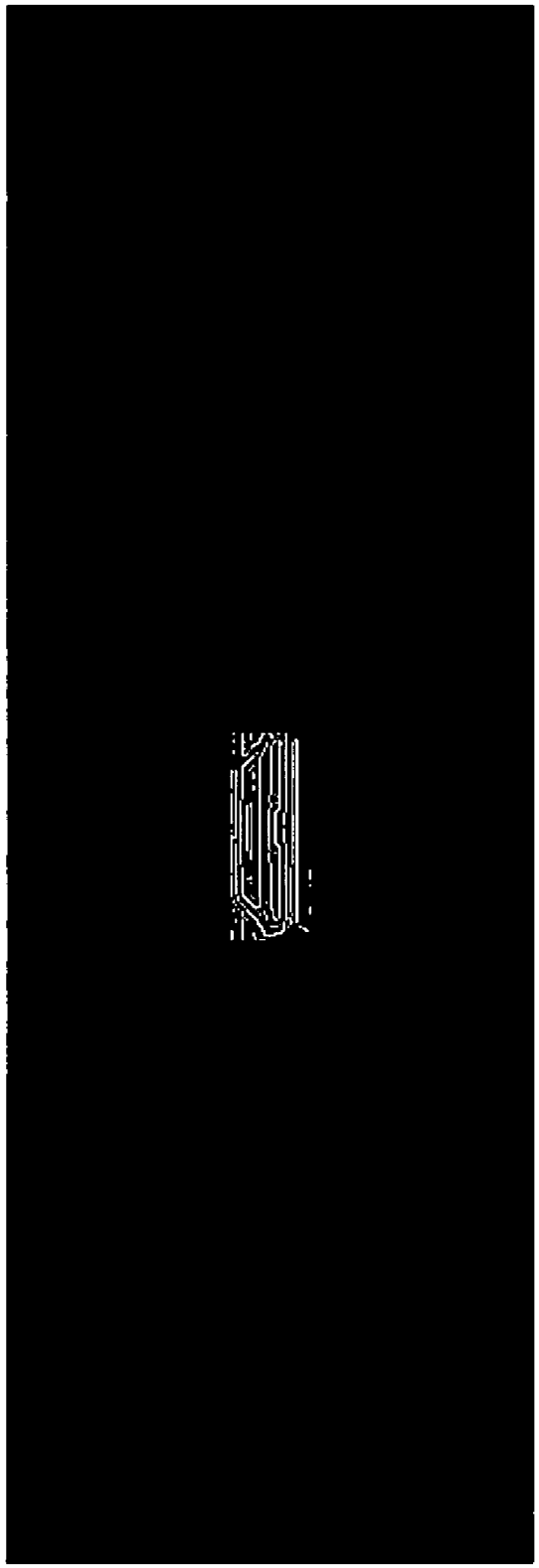
FIG. 6 illustrates an isometric original edge map in accordance with one embodiment of the present invention.
Figure 7:
FIG. 7 illustrates a vertical edge map in accordance with one embodiment of the present invention.
Figure 8:
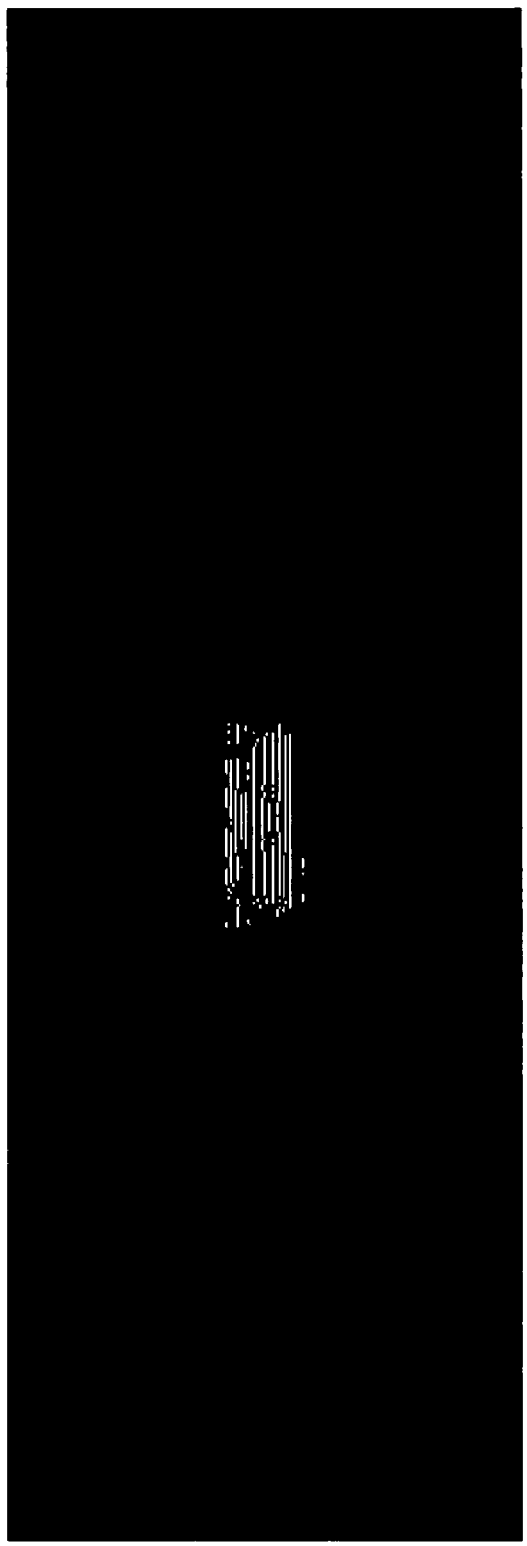
FIG. 8 illustrates a horizontal edge map in accordance with one embodiment of the present invention.

In one embodiment, edge detection may be performed for a car. FIG. 5 illustrates a car located within a region of interest defined by box 505. A Canny edge detector is performed on the original image. An isometric original edge map produced by the Canny edge detector is shown in FIG. 6. The edge detector then determines left and right boundaries of the car body as shown in the vertical edge map of FIG. 7. The edge detector also determines the top and bottom boundaries of the car body as shown in the horizontal edge map of FIG. 8.

Figure 9:
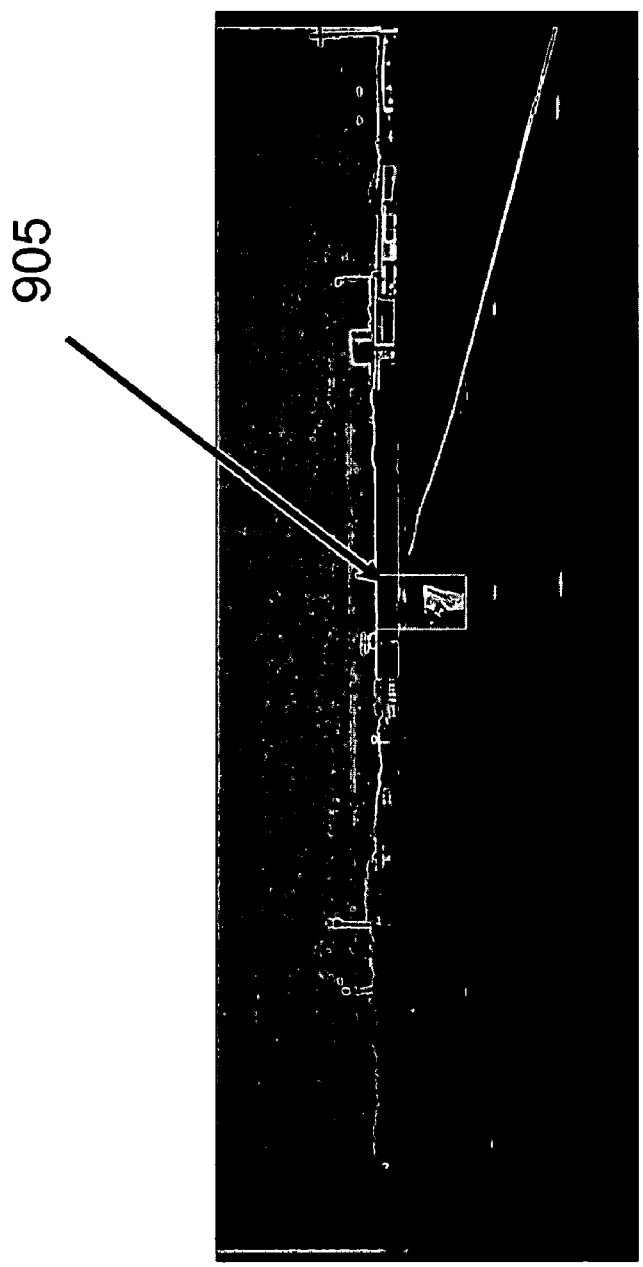
FIG. 9 illustrates a pedestrian located within a region of interest in accordance with one embodiment of the present invention.
Figure 10:
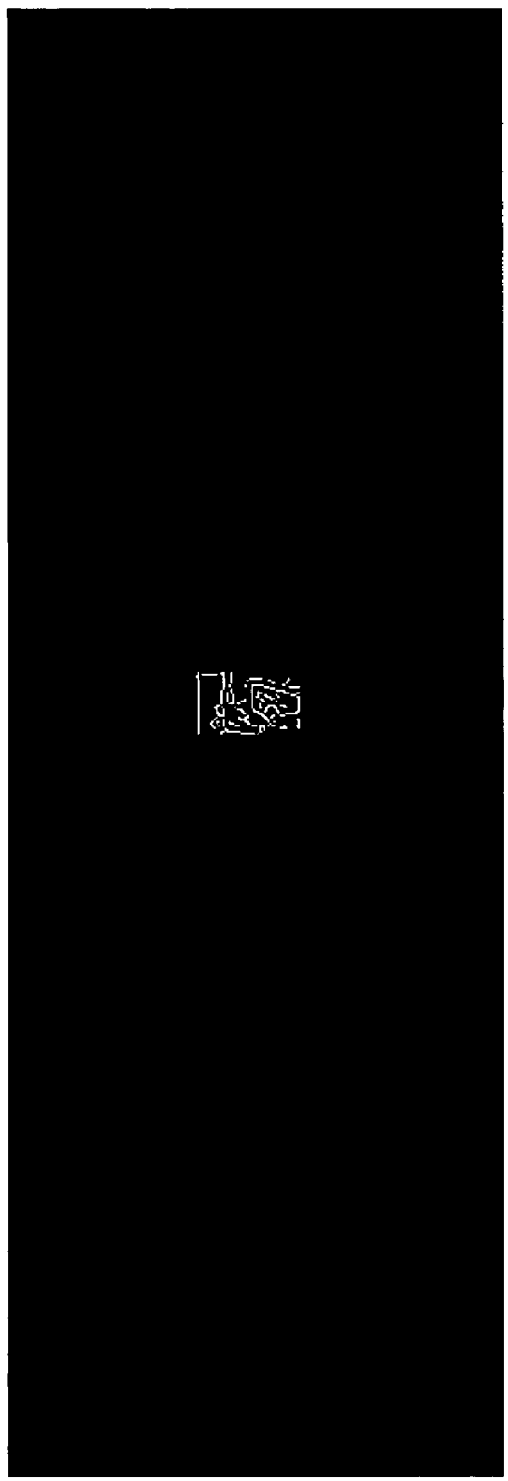
FIG. 10 illustrates an isometric original edge map in accordance with one embodiment of the present invention.
Figure 11:
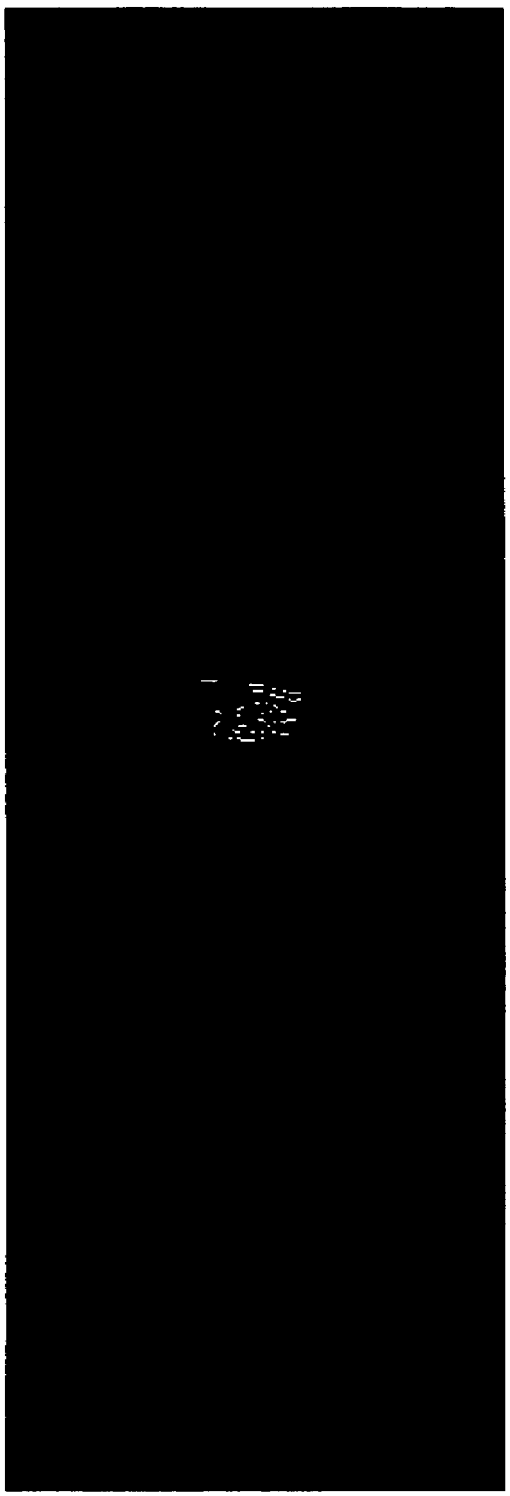
FIG. 11 illustrates a vertical edge map in accordance with one embodiment of the present invention.

In one embodiment, edge detection may be performed for a pedestrian. FIG. 9 illustrates a pedestrian located within a region of interest defined by box 905. A Canny edge detector is performed on the original image. An isometric original edge map produced by the Canny edge detector is shown in FIG. 10. For pedestrian cases, parts of a human model such as a head, and the upper and lower torso are looked for in the edge map. The upper and lower torso correspond to left and right upper body boundaries, and left and right lower body boundaries, respectively, as shown in the vertical edge map of FIG. 11.

Figures 12, 13:
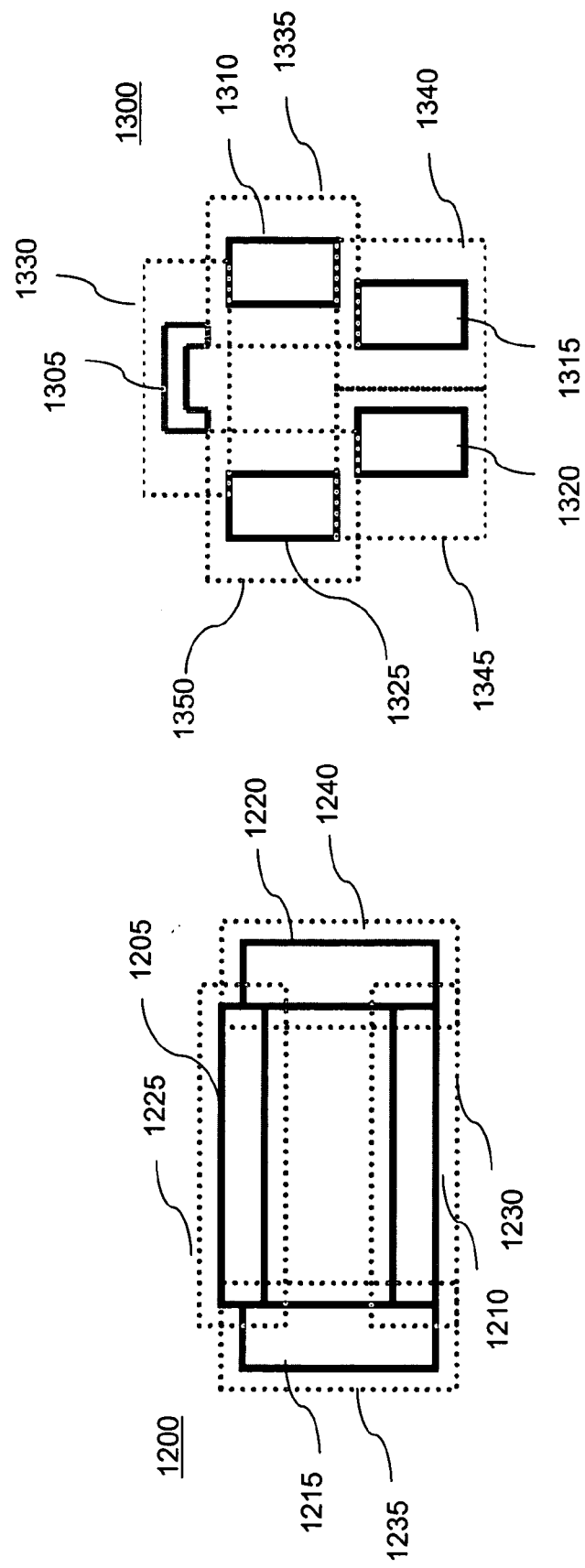
FIG. 12 illustrates a car model in accordance with one embodiment of the present invention.
FIG. 13 illustrates a pedestrian model in accordance with one embodiment of the present invention.

In step 415, edge analysis is performed on a plurality of sub-regions within the region of interest to generate an edge score. A model based approach is utilized to detect objects. FIGS. 12 and 13 illustrate the car model 1200 and the pedestrian model 1300 used for classification, respectively. It should be apparent to one having skill in the art that similar models may be designed for other objects. Three types of edge maps are computed from the original images, isometric original, horizontal, and vertical. In one embodiment, the edge maps are represented as binary images; i.e., each pixel in the edge image set to "1" represents a detected edge, and each pixel set to "0" represents no edge found at that location in the original image.

Referring to FIGS. 12 and 13, the edge strength is computed in each of the edge boxes, e.g., solid rectangles 1205, 1210, 1215, 1220, 1305, 1310, 1315, 1320, 1325. Each solid rectangle 1205, 1210, 1215, 1220, 1305, 1310, 1315, 1320, 1325 is shifted around its local neighborhood to find the maximum output. The dashed rectangles 1225, 1230, 1235, 1240, 1330, 1335, 1340, 1345, 1350 are the search regions for the edge sum boxes. Boxes 1205, 1210 are computed in the horizontal edge maps. Boxes 1215, 1220, 1310, 1315, 1320, 1325 are computed in the vertical edge maps. Box 1305 is computed in the original isometric edge map. Each box sum is the sum of the edge map regions, normalized by the area of the box in question.

An edge score may be determined from the edge analysis. The edge score is a summation of the individual edge scores of each edge box and is determined in accordance with the following formula:

$$EdgeScore_i = \sum_k BoxSum_k$$

where i represents the type of model used, k represents the number of edge boxes, and BoxSum represents an edge strength for each edge box.

Figure 14:
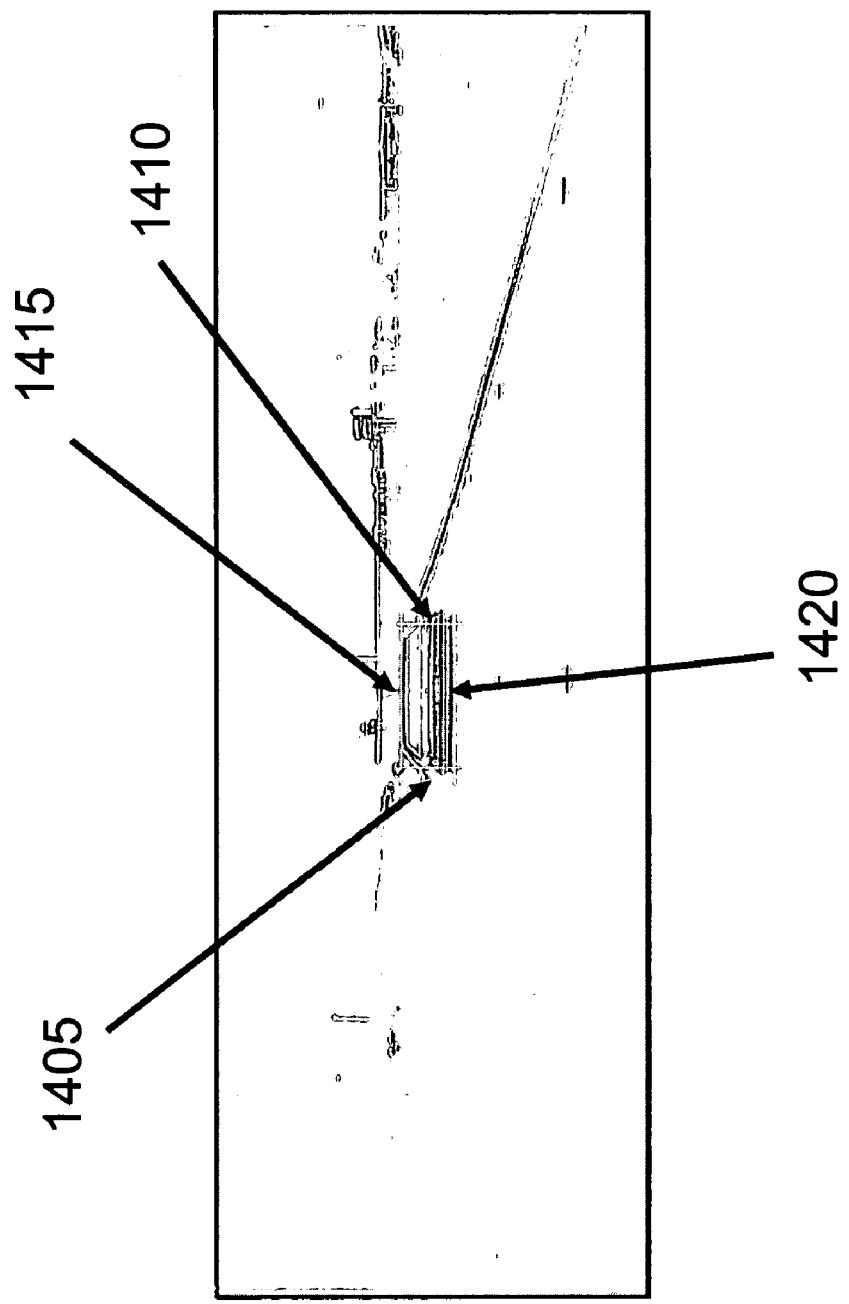
FIG. 14 illustrates detected edges of a car in accordance with one embodiment of the present invention.

FIG. 14 illustrates the detected left 1405, right 1410, top 1415, and bottom 1420 of a car. The left 1405, right 1410, top 1415, and bottom 1420 of the car body is defined as the locations with the highest edge point density. As stated above, the car detector returns a score, which is the sum of the density, e.g., the edge density in the four regions.

Figure 15:
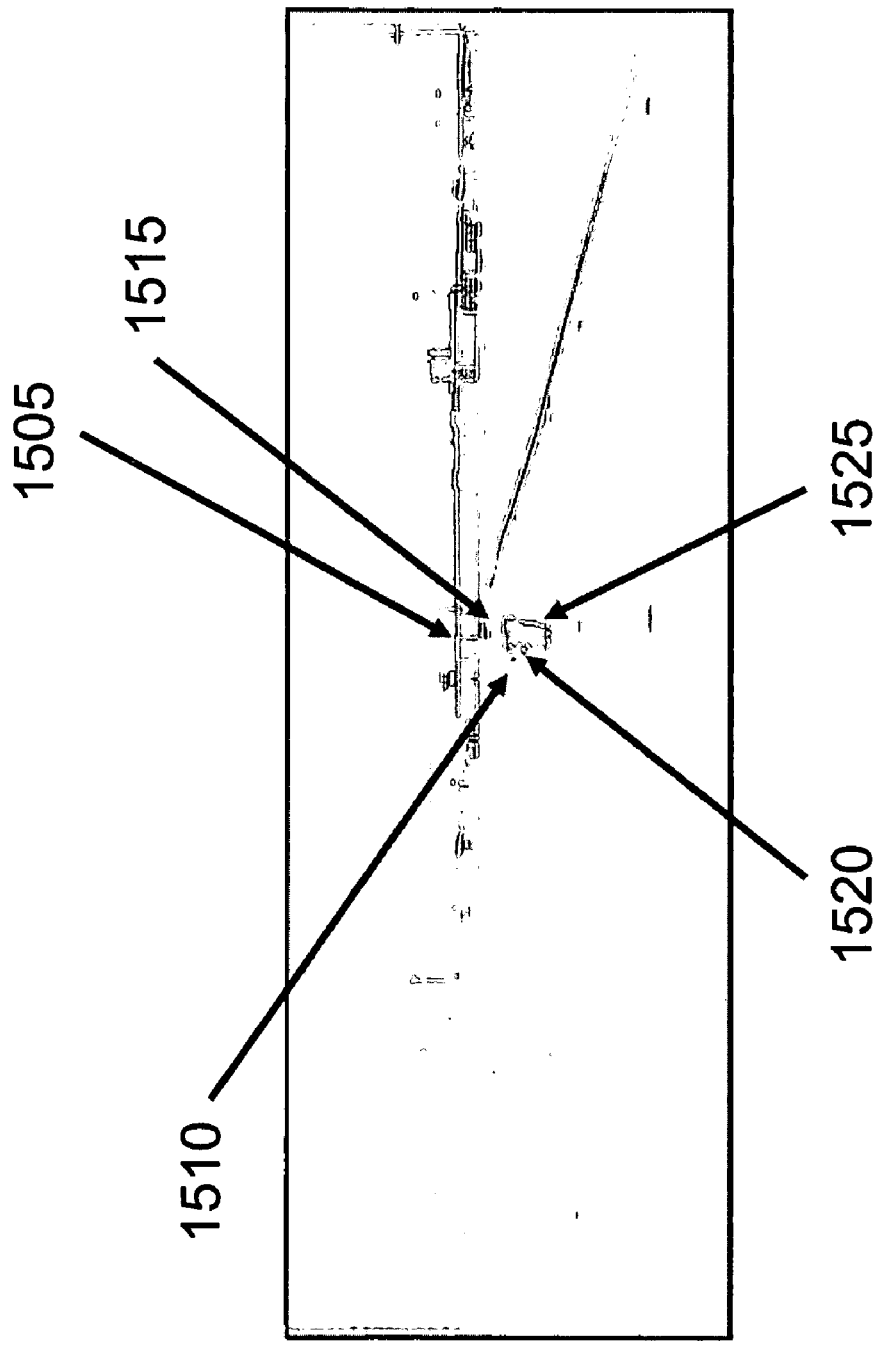
FIG. 15 illustrates detected edges of a pedestrian in accordance with one embodiment of the present invention.

FIG. 15 illustrates the detected head 1505, upper body boundaries 1510, 1515 and lower body boundaries 1520, 1525 of a pedestrian. The upper body boundaries corresponding to the arms and the lower body boundaries correspond to the legs of a pedestrian. The head, upper body boundaries, and lower body boundaries of the pedestrian are defined as the locations with the highest edge point density. As stated above, the pedestrian detector returns a score, which is the sum of the edge density in the five regions.

In step 425, the object is classified based on the edge score. In one embodiment, the object is classified in accordance with a threshold for the edge score. The thresholds for each target type, e.g. vehicle or pedestrian, are typically determined empirically or by a learning process. In one embodiment, a threshold of 1.6 is used for the pedestrian class and 1.8 is used for the vehicle class.

While the foregoing is directed to embodiments of the present invention, other and further embodiments of the invention may be devised without departing from the basic scope thereof, and the scope thereof is determined by the claims that follow.

The invention claimed is:

1. A computer-implemented method of classifying an object in an image, comprising:
   detecting, with a processor, an object within a region of interest;
   matching, with the processor, said object with an object template;
   dividing, with the processor, said object into a plurality of sub-regions based on said object template, wherein each sub-region represents a portion of the detected object;
   performing, with a processor, edge analysis on each of the plurality of sub-regions within said object to generate an edge score for each of said sub-regions;
   summing, with a processor, the edge score for each of said sub-regions; and
   classifying, with a processor, said object based on the sum of said edge scores.

2. The method of claim 1, wherein performing edge analysis comprises performing Canny edge detection.

3. The method of claim 1, wherein said plurality of sub-regions comprise a top region, a bottom region, a left region, and a right region.

4. The method of claim 1, wherein said plurality of sub-regions comprise a head region, a left upper body region, a right upper body region, a left lower body region, and a right lower body region.

5. The method of claim 1, wherein said edge analysis determines an edge density for each sub-region.

6. The method of claim 5, wherein said sum of said edge scores comprises a sum of the edge density for each sub-region.

7. The method of claim 1, wherein said object is classified in accordance with a threshold for said sum of said edge scores.

8. An apparatus for classifying an object in an image, comprising:
   means for detecting said object within a region of interest;
   means for matching said object with an object template;
   means for dividing said object into a plurality of sub-regions based on said object template, wherein each sub-region represents a portion of the detected object;
   means for performing edge analysis on said plurality of sub-regions within said object to generate edge scores for each of said sub-regions;
   means for summing said edge scores of said sub-regions, thereby generating a sum of said edge scores;
   means for classifying said object based on said sum of said edge scores.

9. The apparatus of claim 8, wherein performing edge analysis comprises performing Canny edge detection.

10. The apparatus of claim 8, wherein said plurality of sub-regions comprise a top region, a bottom region, a left region, and a right region.

11. The apparatus of claim 8, wherein said plurality of sub-regions comprise a head region, a left upper body region, a right upper body region, a left lower body region, and a right lower body region.

12. The apparatus of claim 8, wherein said edge analysis determines an edge density for each sub-region.

13. The apparatus of claim 12, wherein said sum of said edge scores comprises a sum of the edge density for each sub-region.

14. The apparatus of claim 8, wherein said object is classified in accordance with a threshold for said sum of said edge scores.

15. A computer-readable medium having stored thereon a plurality of instructions, the plurality of instructions including instructions which, when executed by a processor, cause the processor to perform the steps of a method of classifying an object in an image, comprising:
   detecting said object within a region of interest;
   matching, with the processor, said object with an object template;
   dividing said object into a plurality of sub-regions based on said object template, wherein each sub-region represents a portion of the detected object;
   performing edge analysis on each of the plurality of sub-regions within said object to generate an edge score for each of said sub-regions;

summing the edge score for each of said sub-regions to generate a sum of said edge scores; and classifying said object based on said sum of said edge scores.

16. The computer-readable medium of claim 15, wherein performing edge analysis comprises performing Canny edge detection.

17. The computer-readable medium of claim 15, wherein said plurality of sub-regions comprise a top region, a bottom region, a left region, and a right region.

18. The computer-readable medium of claim 15, wherein said plurality of sub-regions comprise a head region, a left upper body region, a right upper body region, a left lower body region, and a right lower body region.

19. The computer-readable medium of claim 15, wherein said edge analysis determines an edge density for each sub-region.

20. The computer-readable medium of claim 15, wherein said object is classified in accordance with a threshold for said sum of said edge scores.

21. The computer-readable medium of claim 15, wherein performing edge analysis comprises producing an isometric original edge map.

22. The computer-readable medium of claim 15, wherein performing edge analysis comprises producing a horizontal edge map.

23. The computer-readable medium of claim 15, wherein performing edge analysis comprises producing a vertical edge map.

24. The method of claim 1, wherein performing edge analysis comprises producing an isometric original edge map.

25. The method of claim 1, wherein performing edge analysis comprises producing a horizontal edge map.

26. The method of claim 1, wherein performing edge analysis comprises producing a vertical edge map.

27. The apparatus of claim 8, wherein performing edge analysis comprises producing an isometric original edge map.

28. The apparatus of claim 8, wherein performing edge analysis comprises producing a horizontal edge map.

29. The apparatus of claim 8, wherein performing edge analysis comprises producing a vertical edge map.

* * * * *